United States Patent
Yamazaki et al.

(10) Patent No.: US 7,210,849 B2
(45) Date of Patent: May 1, 2007

(54) SLIDING APPARATUS

(75) Inventors: Matsuru Yamazaki, Ojiya (JP); Toyoshi Kazama, Ojiya (JP)

(73) Assignee: Nippon Bearing Co., Ltd, Niigata (JP)

( * ) Notice: Subject to any disclaimer, the term of this patent is extended or adjusted under 35 U.S.C. 154(b) by 116 days.

(21) Appl. No.: 10/840,606

(22) Filed: May 7, 2004

(65) Prior Publication Data
US 2005/0117821 A1   Jun. 2, 2005

(30) Foreign Application Priority Data
Nov. 28, 2003   (JP)   ............... 2003-400699

(51) Int. Cl.
*F16C 29/04*   (2006.01)
(52) U.S. Cl. ............... 384/51; 384/57; 384/47
(58) Field of Classification Search ............ 384/41, 384/51, 49, 50, 550
See application file for complete search history.

(56) References Cited

U.S. PATENT DOCUMENTS

| | | | | |
|---|---|---|---|---|
| 946,439 | A | * | 1/1910 | Hess ............... 384/49 |
| 2,294,665 | A | * | 9/1942 | Jackson ............ 384/47 |
| 3,024,073 | A | * | 3/1962 | Krueger ............ 384/49 |
| 4,517,879 | A | * | 5/1985 | Andersson ......... 384/49 |
| 5,427,454 | A | * | 6/1995 | Tsuboi ............. 384/47 |

FOREIGN PATENT DOCUMENTS

| | | |
|---|---|---|
| JP | 11-315831 | 11/1999 |
| JP | 11-315832 | 11/1999 |

* cited by examiner

*Primary Examiner*—Thomas R. Hannon
(74) *Attorney, Agent, or Firm*—Connolly Bove Lodge & Hutz LLP (57) ABSTRACT

To provide a sliding apparatus which may depress a micro slip phenomenon without fail and realize the system with a simple structure and which is less expensive to save a cost and superior in practical use. In a sliding apparatus in which a sliding member (2) is slid relative to a shaft (1), a loading path (3) is provided between the shaft (1) and the sliding member (2), a plurality of rolling member (4) are arranged in the loading path (3) and the rolling members (4) are adapted to roll and move along the loading path (3), a convex portion (5a) and/or a concave portion are provided to at least one rolling member (5) out of rolling members (4) arranged in the loading path (3), a convex portion and/or a concave portion (3a) engaged with the convex portion (5a) and/or the concave portion of the rolling member (5) are provided to the loading path (3), the rolling member (5) is arranged in the loading path (3) in concave and convex engagement with the loading path (3) and a rolling member retainer (6) for retaining the rolling members (4, 5) is provided in the loading path (3).

29 Claims, 6 Drawing Sheets

FIG. 1

RELATED ART

FIG. 2

RELATED ART

RELATED ART

SLIDING APPARATUS

FIELD OF THE INVENTION

The present invention relates to a sliding apparatus.

BACKGROUND ART

Figure 1:
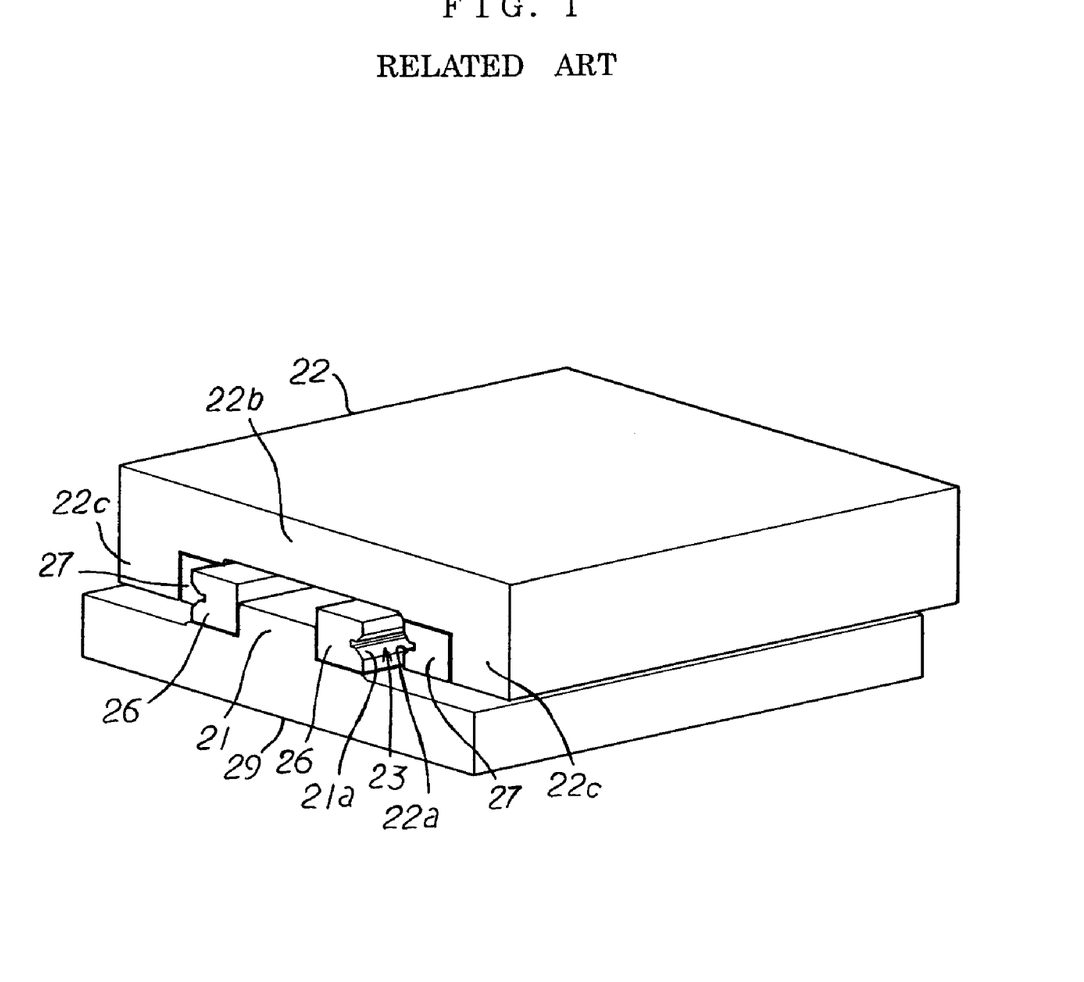
FIG. 1 is a schematic illustrative perspective view of a conventional case.
Figure 2:
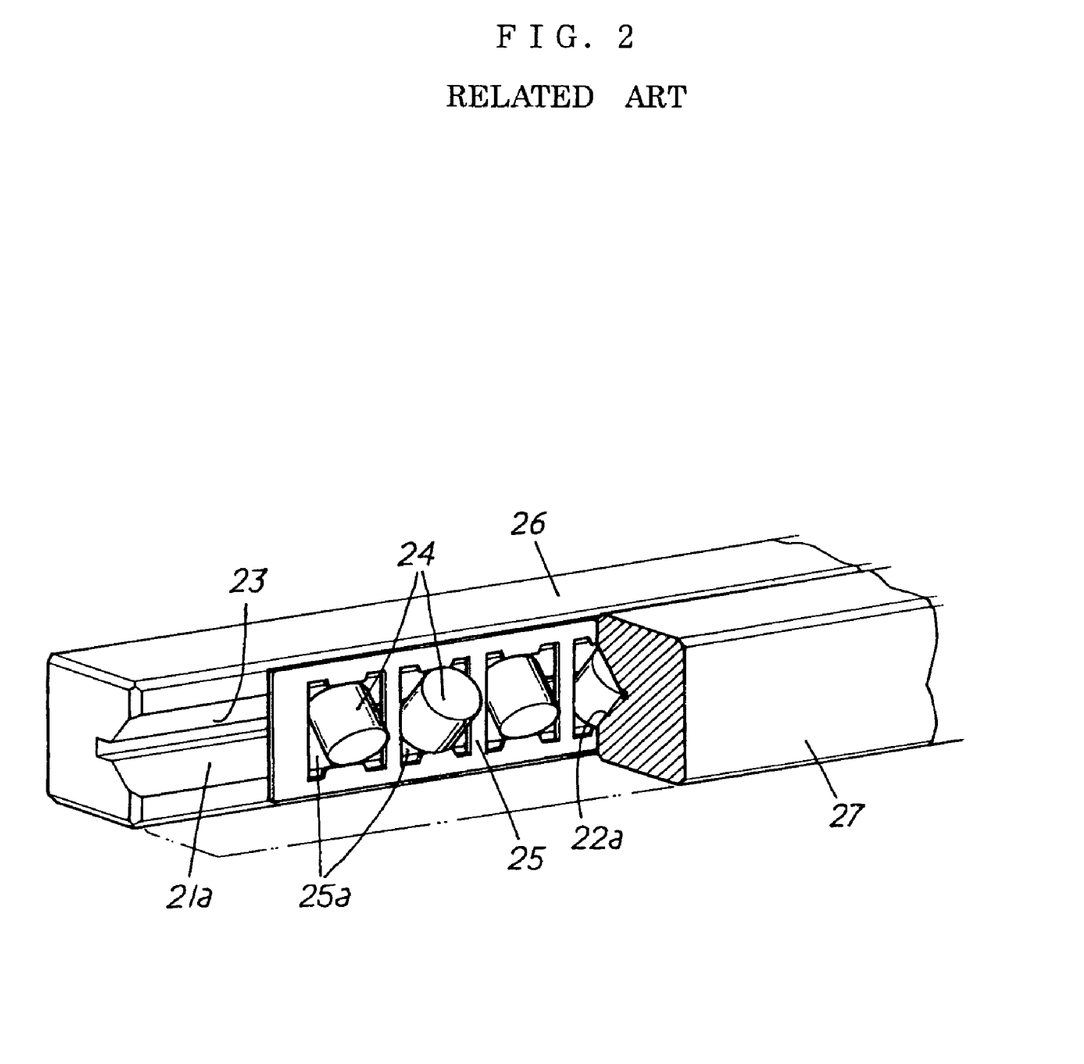
FIG. 2 is an enlarged illustrative cross-sectional view of a loading path of the conventional case.

As shown in FIGS. 1 and 2, a general sliding apparatus is provided in which a sliding member 22 having a substantially inverted U-shaped cross section and having arm portions 22c on the right and left sides of a base portion 22b is fitted on a shaft 21 provided on a base member 29, the sliding member 22 is adapted to be slidable reciprocatingly relative to the shaft 21, a loading path 23 composed of first loading grooves 21a provided on both sides of the shaft 21 and second loading grooves 22a provided, respectively, on inner surfaces of right and left arm portions 22c of the sliding member 22 and confronted with the first loading grooves 21a is provided between the shaft 21 and the sliding member 22, and a plurality of rolling members 24 are arranged at a predetermined interval in the loading path 23 so that the rolling members 24 may be rolled and moved in accordance with the sliding movement of the sliding member 22. Incidentally, in the drawings, reference numeral 26 denotes first loading portion forming member provided on the shaft 21 and reference numeral 27 denotes second loading portion forming member provided on the sliding member 22.

By the way, as described above, the sliding member 22 is slidingly moved relative to the shaft 21 together with the rolling movement of the rolling members 24. However, since when the rolling members 24 collide against each other upon rolling movement, this causes the hindrance of the smooth sliding movement of the sliding member 22 or the generation of noises, rolling member retainers 25 in which rolling member aligning windows 25a are formed in a plate member are arranged in the above-described loading path 23 and the rolling members 24 are arranged in the rolling member aligning windows 25a of the rolling member retainers 25 as shown in FIG. 2, whereby the interval between the adjacent rolling members 24 may be kept constant and the collision of the adjacent rolling members 24 may be prevented.

On the other hand, it is known that, in the conventional sliding apparatus, a phenomenon that a relative position among the shaft 21, the sliding member 22 and the rolling member retainers 25 is gradually displaced in accordance with the reciprocating sliding movement of the sliding member 22, i.e., a so-called "micro slip" phenomenon would occur.

The displacement of the rolling member retainers 25 due to the micro slip phenomenon causes the friction between the rolling member retainers 25 and the rolling members 24. This friction prevents the smooth movement of the sliding members 22 or causes the noises. Furthermore, when the displacement becomes remarkable, the rolling member retainers 25 would be broken to cause a serious damage to the instrument into which the sliding apparatus is incorporated.

Figure 3:
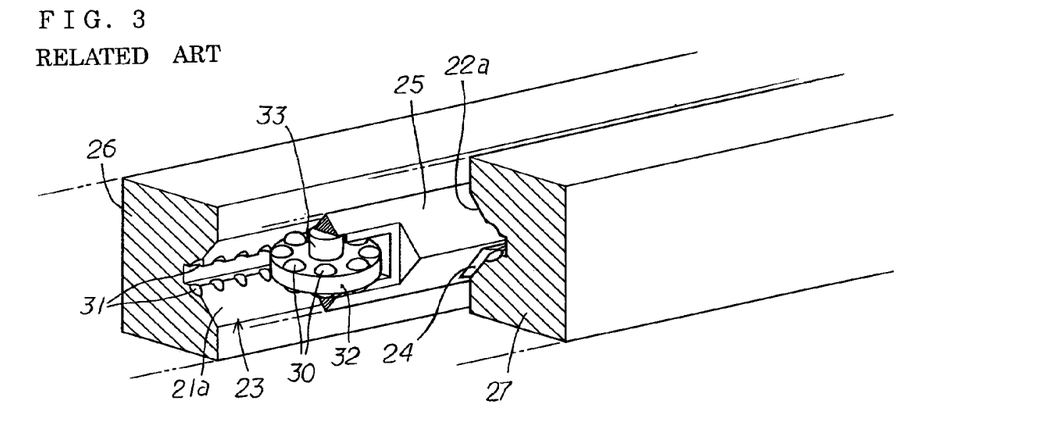
FIG. 3 is an enlarged illustrative cross-sectional view of a loading path of another conventional case.
Figure 4:
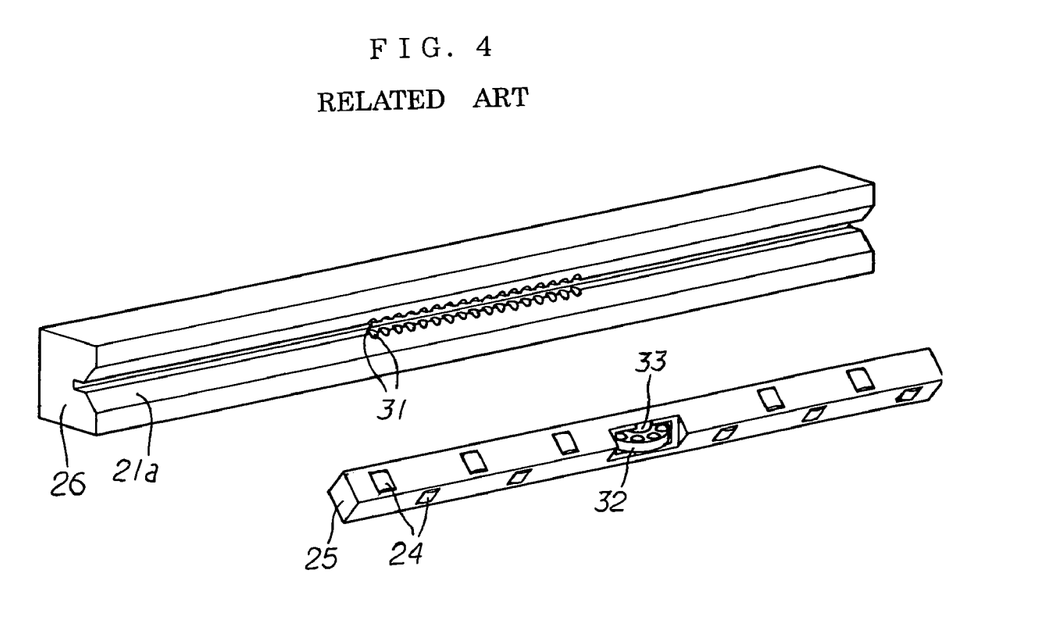
FIG. 4 is an exploded illustrative perspective view of the conventional case.
Figure 5:
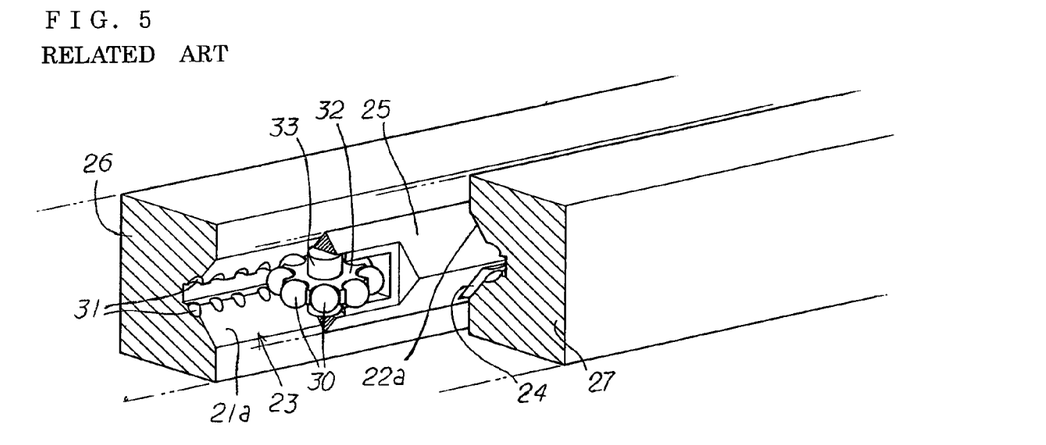
FIG. 5 is an enlarged illustrative cross-sectional view of a loading path of another conventional case.
Figure 6:
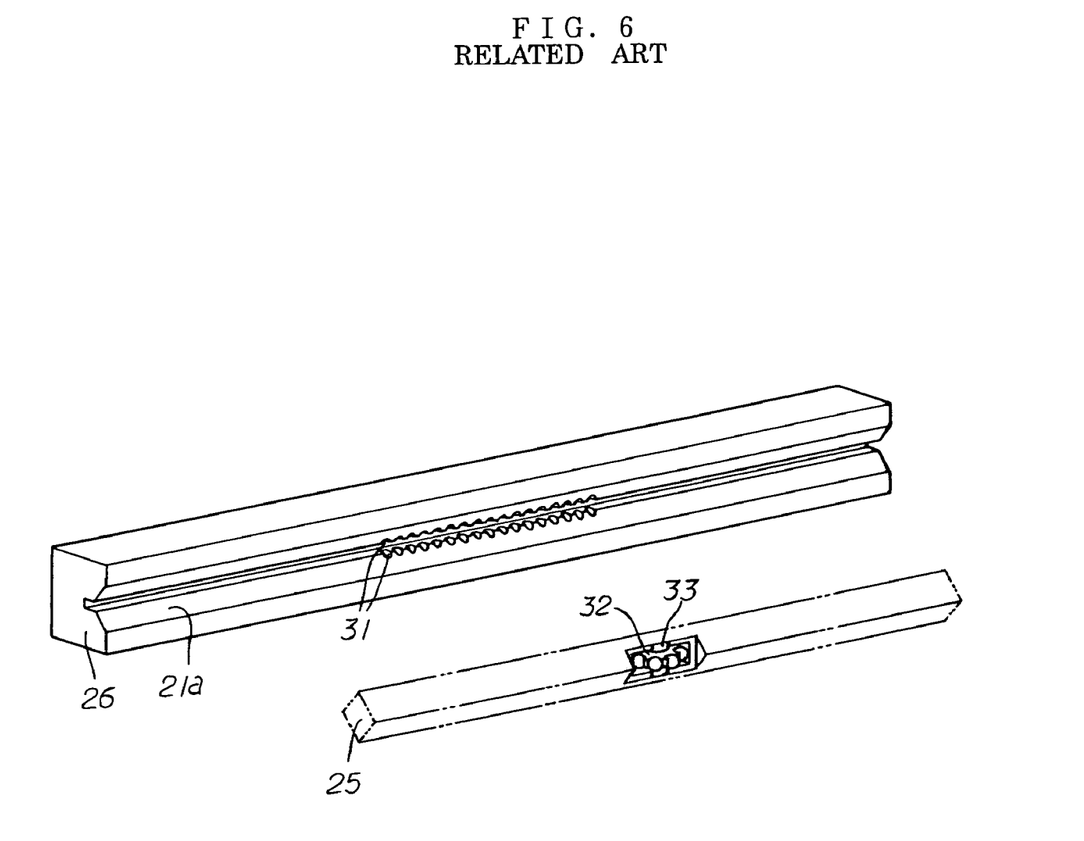
FIG. 6 is an exploded illustrative perspective view of the conventional case.

Therefore, in order to prevent the above-described micro slip phenomenon, for example, as in Japanese Patent Application Laid-Open No. Hei 11-315831 (hereinafter referred to as Patent Publication 1) as shown in FIGS. 3 and 4 and as in Japanese Patent Application Laid-Open No. Hei 11-315832 (hereinafter referred to as Patent Publication 2) as shown in FIGS. 5 and 6, a disc member 32 having a plurality of convex portions 30 is coupled with a rolling member retainer 25, a plurality of concave portions 31 in concave and convex engagement with the convex portions 30 of the disc member 32 are provided in a loading path 23, the convex and concave engagement mechanism composed of the convex portions 30 and the concave portions 31 is caused to work so that the rolling member retainer 25 is moved along the loading path 23, whereby the above-described displacement of the rolling member retainer 25 may be prevented. However, this is complicated in structure and inferior in durability and worse in maintenance property and it is inevitable to increase the cost.

More specifically, Patent Publications 1 and 2 are directed to the structure where the disc member 32 which is discrete from the rolling members 24 to be coupled with the rolling member retainer 25 is provided in a central portion of the rolling member retainer 25. Since this disc member 32 is not subjected to any load from the loading path 23, the convex and concave engagement relationship of the convex and concave engagement mechanism is loose (that is, the convex and concave engagement is not firmly attained). Thus, it is impossible to completely prevent the micro slip phenomenon.

Also, since the disc member 32 is large in size relative to the rolling members 24, an effective stroke length of the sliding member is short. If this effective stroke length is to be elongated, it is necessary to shorten the length of the rolling member retainer 25 correspondingly, so that the rolling members 24 retained by the rolling member retainer 25 are reduced to cause a problem that the loading capacity is reduced.

Furthermore, since the disc member 32 is adapted to be coupled with the rolling member retainer 25, it is necessary to provide a shaft 33 for pivotally retaining the disc member 32. Since this is usually made of resin, the machining thereof is troublesome in precision and rigidity.

Patent Publication 1: Japanese Patent Application Laid-Open No. Hei 11-315831
Patent Publication 2: Japanese Patent Application Laid-Open No. Hei 11-315832

SUMMARY OF THE INVENTION

In view of the foregoing defects, an object of the present invention is to provide a sliding apparatus in which a concave and convex engagement relationship is applied between a rolling member receiving a load as other rolling members and a loading path and a rolling member retainer may be moved along the loading path under the positive concave and convex engagement condition to thereby make it possible to suppress a micro slip phenomenon and to realize the system with a simple structure and which has a good productivity, may save cost and is superior in practical use.

An essence of the invention will now be described briefly with reference to the accompanying drawings.

A first aspect of the invention, there is provided a sliding apparatus in which a sliding member (2) is slid relative to a shaft (1), a loading path (3) is provided between the shaft (1) and the sliding member (2), a plurality of rolling member (4) are arranged in the loading path (3) and the rolling members (4) are adapted to roll and move along the loading path (3), characterized in that a convex portion (5a) and/or a concave portion are provided to at least one rolling member (5) out of rolling members (4) arranged in the loading path (3), a convex portion and/or a concave portion (3a) engaged with the convex portion (5a) and/or the concave portion of the rolling member (5) are provided to the loading path (3), the rolling member (5) is arranged in the loading path (3) in concave and convex engagement with the loading path (3) and a rolling member retainer (6) for retaining the rolling members (4, 5) is provided in the loading path.

Also, according to a second aspect of the invention, in the sliding apparatus according to the first aspect, the rolling member (5) provided with the convex portion (5a) and/or concave portion is adapted to retain the concave and convex engagement condition and roll and move along the loading path (3).

According to a third aspect of the invention, in the sliding apparatus according to the first aspect, a plurality of concave portions and convex portions (5a) are provided at a predetermined interval on a circumferential surface of said at least one rolling member (5), and a plurality of concave portions (3a) and/or convex portions are provided at the same interval as that of the concave portions and/or convex portions (5a) of said rolling member (5) are provided in the loading path (3).

According to a fourth aspect of the invention, in the sliding apparatus according to the second aspect, a plurality of concave portions and convex portions (5a) are provided at a predetermined interval on a circumferential surface of said at least one rolling member (5), and a plurality of concave portions (3a) and/or convex portions are provided at the same interval as that of the concave portions and/or convex portions (5a) of said rolling member (5) are provided in the loading path (3).

According to a fifth aspect of the invention, in the sliding apparatus according to the third aspect, the convex portion (5a) is provided only on a central rolling member (5) out of the rolling members (4) retained in the rolling member retainer (6) and the concave portion (3a) is provided in a range where said central rolling member (5) of the loading path (3) moves.

According to a sixth aspect of the invention, in the sliding apparatus according to the fourth aspect, the convex portion (5a) is provided only on a central rolling member (5) out of the rolling members (4) retained in the rolling member retainer (6) and the concave portion (3a) is provided in a range where said central rolling member (5) of the loading path (3) moves.

According to a seventh aspect of the invention, in the sliding apparatus according to any one of the first to sixth aspects, the rolling member (5) is formed integrally with the convex portion (5a) and/or concave portion.

According to an eighth aspect of the invention, in the sliding apparatus according to any one of the first to sixth aspects, cylindrical members are adopted as the rolling members (4), the cylindrical members are arranged in a direction different from that of the adjacent cylindrical member, and the convex portions are provided on a drum portion of the cylindrical member.

According to an ninth aspect of the invention, in the sliding apparatus according to the seventh aspect, cylindrical members are adopted as the rolling members (4), the cylindrical members are arranged in a direction different from that of the adjacent cylindrical member, and the convex portions are provided on a drum portion of the cylindrical member.

According to a tenth aspect of the invention, in the sliding apparatus according to any one of the first to sixth aspects, the loading path (3) is composed of a first loading groove (1a) provided in the shaft (1) and a second loading groove (2a) provided in the sliding member (2).

According to an eleventh aspect of the invention, in the sliding apparatus according to the seventh aspect, the loading path (3) is composed of a first loading groove (1a) provided in the shaft (1) and a second loading groove (2a) provided in the sliding member (2).

According to a twelfth aspect of the invention, in the sliding apparatus according to the eighth aspect, the loading path (3) is composed of a first loading groove (1a) provided in the shaft (1) and a second loading groove (2a) provided in the sliding member (2).

According to a thirteenth aspect of the invention, in the sliding apparatus according to the ninth aspect, the loading path (3) is composed of a first loading groove (1a) provided in the shaft (1) and a second loading groove (2a) provided in the sliding member (2).

According to a fourteenth aspect of the invention, in the sliding apparatus according to any one of the first to sixth aspects, a first loading groove (1a) is formed in a first loading portion forming member (7) provided in the shaft (1) and a second loading groove (2a) is formed in a second loading portion forming member (8) provided in the sliding member (2).

According to a fifteenth aspect of the invention, in the sliding apparatus according to the seventh aspect, a first loading groove (1a) is formed in a first loading portion forming member (7) provided in the shaft (1) and a second loading groove (2a) is formed in a second loading portion forming member (8) provided in the sliding member (2).

According to a sixteenth aspect of the invention, in the sliding apparatus according to the eighth aspect, a first loading groove (1a) is formed in a first loading portion forming member (7) provided in the shaft (1) and a second loading groove (2a) is formed in a second loading portion forming member (8) provided in the sliding member (2).

According to a seventeenth aspect of the invention, in the sliding apparatus according to the ninth aspect, a first loading groove (1a) is formed in a first loading portion forming member (7) provided in the shaft (1) and a second loading groove (2a) is formed in a second loading portion forming member (8) provided in the sliding member (2).

According to a eighteenth aspect of the invention, in the sliding apparatus according to the tenth aspect, a first loading groove (1a) is formed in a first loading portion forming member (7) provided in the shaft (1) and a second loading groove (2a) is formed in a second loading portion forming member (8) provided in the sliding member (2).

According to a nineteenth aspect of the invention, in the sliding apparatus according to the eleventh aspect, a first loading groove (1a) is formed in a first loading portion forming member (7) provided in the shaft (1) and a second loading groove (2a) is formed in a second loading portion forming member (8) provided in the sliding member (2).

According to a twentieth aspect of the invention, in the sliding apparatus according to the twelfth aspect, a first loading groove (1a) is formed in a first loading portion forming member (7) provided in the shaft (1) and a second loading groove (2a) is formed in a second loading portion forming member (8) provided in the sliding member (2).

According to a twenty-first aspect of the invention, in the sliding apparatus according to the thirteenth aspect, a first loading groove (1a) is formed in a first loading portion forming member (7) provided in the shaft (1) and a second loading groove (2a) is formed in a second loading portion forming member (8) provided in the sliding member (2).

According to a twenty-second aspect of the invention, in the sliding apparatus according to any one of the first to sixth aspects, the rolling member, the convex portion, a first loading portion forming member (7) and a second loading portion forming member (8) are made of metal, respectively.

According to a twenty-third aspect of the invention, in the sliding apparatus according to the seventh aspect, the rolling member, the convex portion, a first loading portion forming member (7) and a second loading portion forming member (8) are made of metal, respectively.

According to a twenty-fourth aspect of the invention, in the sliding apparatus according to the eighth aspect, the rolling member, the convex portion, a first loading portion forming member (7) and a second loading portion forming member (8) are made of metal, respectively.

According to a twenty-fifth aspect of the invention, in the sliding apparatus according to the ninth aspect, the rolling member, the convex portion, a first loading portion forming member (7) and a second loading portion forming member (8) are made of metal, respectively.

According to a twenty-sixth aspect of the invention, in the sliding apparatus according to the tenth aspect, the rolling member, the convex portion, a first loading portion forming member (7) and a second loading portion forming member (8) are made of metal, respectively.

According to a twenty-seventh aspect of the invention, in the sliding apparatus according to the eleventh aspect, the rolling member, the convex portion, a first loading portion forming member (7) and a second loading portion forming member (8) are made of metal, respectively.

According to a twenty-eighth aspect of the invention, in the sliding apparatus according to the twelfth aspect, the rolling member, the convex portion, a first loading portion forming member (7) and a second loading portion forming member (8) are made of metal, respectively.

According to a twenty-ninth aspect of the invention, in the sliding apparatus according to the thirteenth aspect, the rolling member, the convex portion, a first loading portion forming member (7) and a second loading portion forming member (8) are made of metal, respectively.

With such a structure, according to the present invention, it is possible to provide a sliding apparatus which may suppress a micro slip phenomenon without fail and may realize the system with a simple structure and which has a high productivity, may save cost and is superior in practical use.

A preferable mode of embodying the invention will now be described together with resultant effects with reference to the accompanying drawings.

Since a rolling member 5 receiving a load is in concave and convex engagement with a loading path 3, the rolling member 5 is not slid relative to a shaft 1 and a sliding member 2, the displacement to a rolling member retainer 6 for holding the rolling members 4, 5, the shaft 1 and the sliding member 2 would not occur.

As described above, according to the present invention, there is provided a sliding apparatus which may prevent the micro slip phenomenon of the rolling member retainer and which may realize the system with a simple structure, has a high productivity, is less costly and superior in practical use.

EMBODIMENTS

Figure 7:
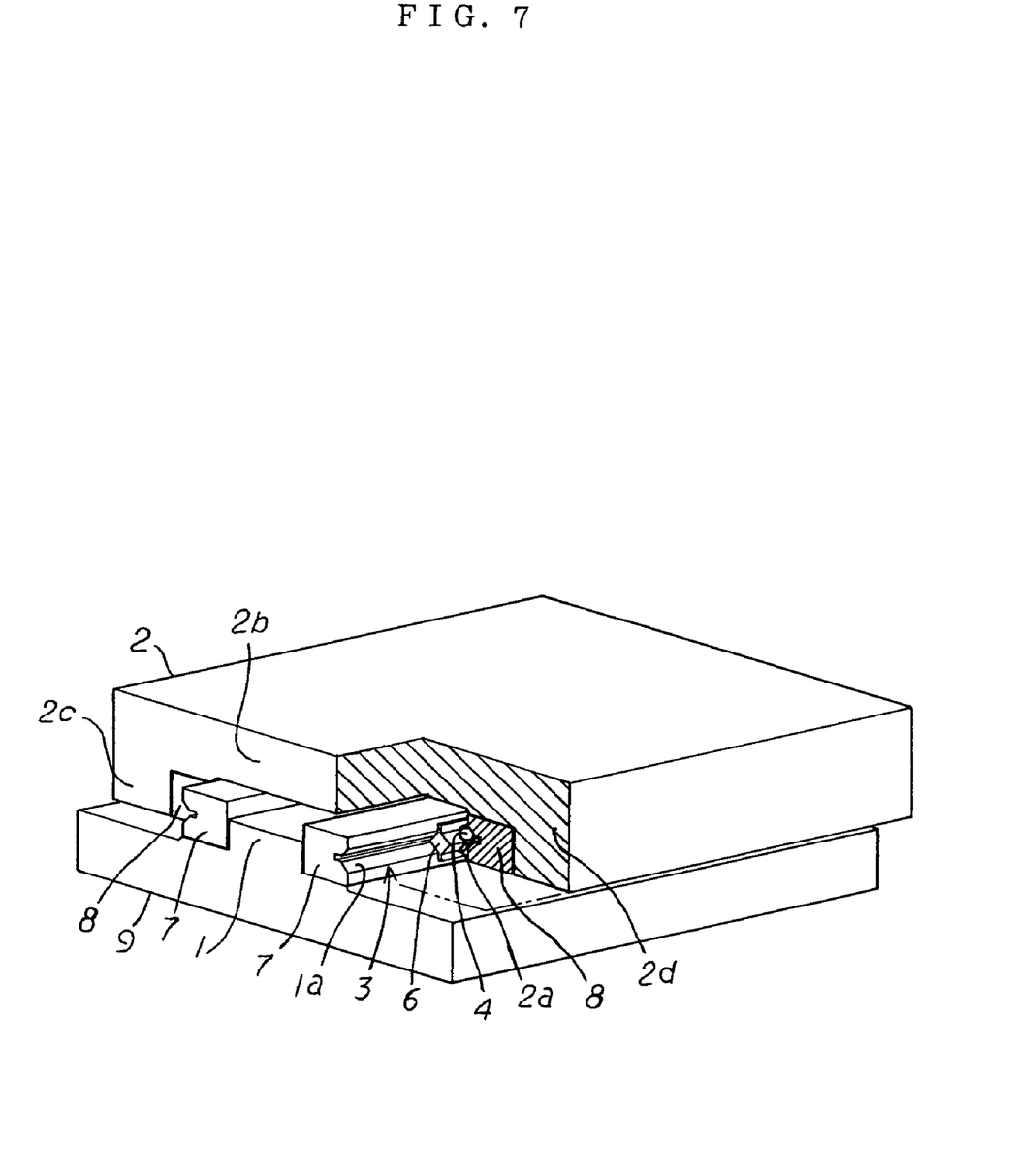

A specific embodiment of the invention will now be described with reference to FIGS. 7 to 9.

This embodiment is directed to a sliding apparatus in which a sliding member 2 is moved to a shaft 1, a loading path 3 is provided between the shaft 1 and the sliding member 2, and a plurality of rolling members 4 are arranged in the loading path 3 so that the rolling members 4 are rolled and moved along the loading path 3. A convex portion 5a is provided on a single or a plurality of rolling members 5 out of the rolling members 4 disposed in the loading path 3. On the other hand, a concave portion to be engaged with the convex portion 5a of the rolling member 5 is provided in the loading path 3. The above-described rolling members 5 are arranged in the above-described loading path in the convex and concave engagement with the loading path 3. Rolling member retainers 6 for retaining the above-described rolling members 4 and 5 are provided in the loading path 3.

Each portion will now be described more specifically.

The shaft 1 is provided on an upper portion of a base member 9. The sliding member 2 having a substantially inverted U-shaped cross section and having arm portions 2c and 2d on the right and left sides of a base portion 2b is fitted on the shaft 1.

First loading portion forming members 7 made of metal and provided with first loading grooves 1a are provided in side portions of the shaft 1 and second loading portion forming member 8 made of metal and provided with second loading grooves 2a confronted with the above-described first loading grooves 1a are formed in inner surfaces of the right and left arm portions 2c and 2d of the sliding member 2.

In this embodiment, the above-described first loading portion forming members 7 and the shaft 1, and the second loading portion forming members 8 and the sliding member 2 are formed discretely from each other. It is however possible to integrate these members.

The loading path 3 having a transfer surface for receiving a load from the rolling members 4 is composed of the first loading grooves 1a and the second loading grooves 2a.

The first loading grooves 1a and the second loading grooves 2a are set up in substantially laterally directed V-shaped cross-section, respectively. The loading path 3 is set up in substantially regular lozenge shape by the first loading grooves 1a and the second loading grooves 2a.

A number of cylindrical members made of metal are arranged as the rolling members 4 in this loading path 3. These cylindrical members are arranged to meet a positional relationship of twist with respect to the axes of the adjacent cylindrical members to each other (namely, the adjacent cylindrical members are arranged in directions different by 90 degrees). Also, the outer circumference of the cylindrical members is brought into contact with one confronting transfer surface of the first loading grooves 1a and the second loading grooves 2a. Its end face is brought into contact with the other confronting transfer surface of the first loading grooves 1a and the second loading grooves 2a.

Also, projections made of metal are formed as the convex portions 5a at predetermined intervals (at a constant interval in this case) on a drum portion 5b of the rolling member 5 held in the center of the rolling body retainer 6 out of the cylindrical members.

Figure 8:
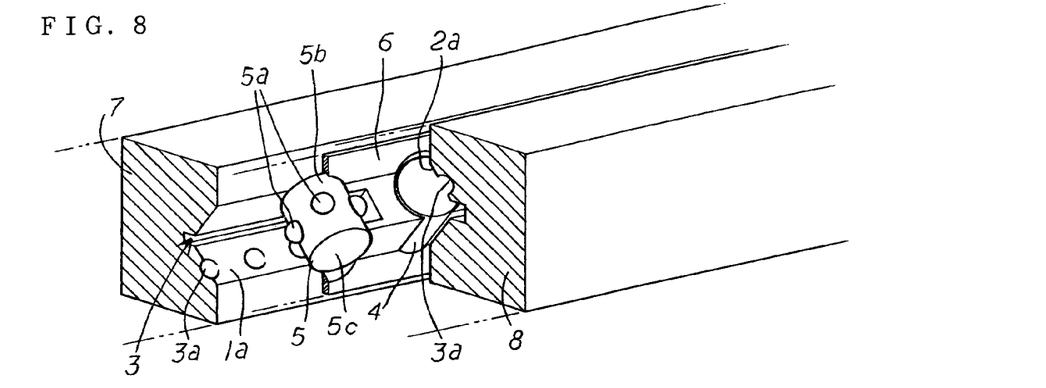
FIG. 8 is an enlarged illustrative cross-sectional view of a loading path of the embodiment shown in FIG. 7.
Figure 9:
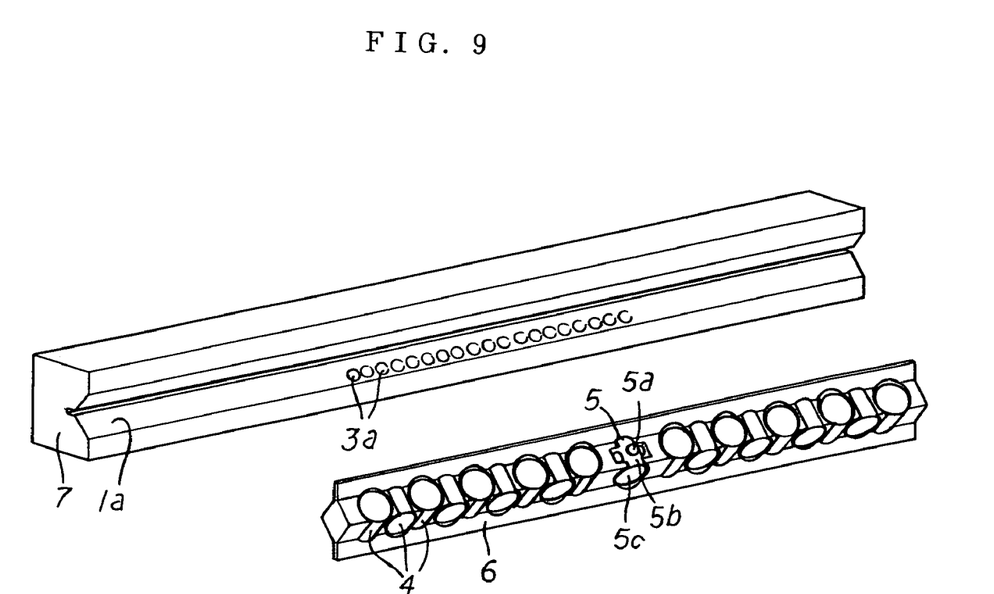
FIG. 9 is an exploded illustrative perspective view of the embodiment shown in FIG. 7.

Holes are formed as the concave portions 3a that is aligned and engaged with the convex portions 5a provided on the rolling member 5 on the transfer surface of the loading path 3 (the transfer surface on the lower side of the first loading grooves 1a in FIG. 8 and on the upper side of the second loading grooves 2a in FIG. 8). The concave portions 3a (holes) are provided at the same interval as that of the convex portions 5a provided on the above-described rolling member 5 and in the range where the rolling member 5 moves.

Also, the round shape of the projections is set in a spherical shape. The round shape of the holes is set to be somewhat larger than the round shape of the projections. Incidentally, the holes and the projections are designed so that any projection is fitted in any hole without fail.

Also, in this embodiment, only one rolling member 5 is in convex and concave engagement with the loading path 3 out of the rolling members 4 held by the rolling member retainer 6. However, it is possible to retain a plurality of rolling members 5 out of the rolling members 4 in concave and convex engagement with the loading path 3. Also, in this case, the concave portions 3a are formed in the range where the rolling the respective rolling members 5 move. Incidentally, the concave portions 3a may be provided over the full length of the transfer surface rather than a predetermined range of the transfer surface of the loading path 3.

Accordingly, in this embodiment, the convex portions 5a of the rolling member 5 is in concave and convex engagement with the concave portions 3a of the loading path 3 whereby the rolling member 5 is positioned in a predetermined position of the loading path 3, and the movement of the rolling member retainer 6 by which the rolling member 5 is retained is suitably limited to thereby prevent the micro slip to make it possible to smoothly slidingly move the sliding member 2.

Namely, the rolling member 5 is subjected to the load from the loading path 3 in the same manner as the other rolling members 4. Accordingly, the concave and convex engagement between the rolling member 5 and the loading path 3 is positively performed. Accordingly, correspondingly, the movement of the rolling member retainer 6 may be suitably performed.

In addition, since the round shape of the projections is set in the spherical shape and the round shape of the holes is set to be somewhat larger than the round shape of the projections, even if the micro slip is generated in the rolling member retainer 6 guided by the rolling member 5, the centering function for returning the rolling member 5 for guiding the rolling member retainer 6 back to the proper original position is exhibited. Incidentally, the centering function works over the universal direction because the round shape of the projections is in spherical shape.

Also, since the rolling member 5 is constructed so that its outer circumferential surface 5b is brought into contact with one confronting transfer surface of the first loading groove 1a and the second loading groove 2a and its end face 5c is brought into contact with the other transfer surface of the first loading groove 1a and the second loading groove 2a in the same manner as the other rolling members 4, the displacement of the rolling member 5 is also prevented by the contact between the end face 5c and the above-described other confronting transfer surface. In synergy effect with the above-described centering function, the positioning effect of the rolling member 5 is exhibited more effectively and, correspondingly, the effect for guiding the rolling member retainer 6 is exhibited extremely well.

Also, the rolling member 5, the convex portions 5a, the first loading portion forming member 7 and the second loading portion forming member 8 are made of metal and may be machined with high precision in comparison with those made of resin. The concave and convex engagement among the convex portions 5a of the rolling member 5 and the concave portions 3a of the loading path 3 may be performed more effectively to thereby perform the guidance of the rolling member retainer 6 more effectively and to thereby make it possible to prevent the micro slip phenomenon generated in the rolling member retainer 6 more positively.

In addition, since these members are made of metal, the system is superior in rigidity, a strain or the like due to the stress generated by the sliding movement of the sliding member 2 hardly occurs and it is possible to maintain the concave and convex engagement between the loading path 3 and the concave portions 3a without fail, to move the rolling member retainer 6 without any micro slip along the loading path 3 without fail and to prolong the service life.

Also, in the case where the rolling member 5 and the convex portions 5a are formed integrally with each other, the system is much superior in rigidity and easiness in manufacture.

Also, since the rolling member 5 is constructed not to be coupled with the rolling member retainer 6 but to be retained at the rolling member retainer 6 in the same manner as the other rolling members 4, the structure is extremely simple, it is unnecessary to mount the rolling member retainer through the shaft as in the conventional case, and correspondingly, the number of steps for work and the number of the parts may be reduced so that the breakdown hardly would occur and the manufacture is simplified.

Furthermore, since the rolling member 5 has substantially the same size as that of the other rolling members 4, there is no fear that the effective stroke length of the sliding member is shortened or the loading capacity is reduced as in the conventional case where the disc member is provided.

In the foregoing embodiment, a well known cross-roller mechanism is used as the sliding mechanism, the convex portions 5a are provided on the cross roller used in the cross roller mechanism, and the concave portions 3a fitted and engaged with the convex portions 5a are provided in the transfer surface of the loading path 3 along which the cross roller rolls and moves.

Incidentally, it is possible to adopt another sliding mechanism like a structure where balls are arranged as the rolling members in arcuate loading grooves.

Also, since the rolling member retainer 6 is moved in the range where it is guided by the rolling member 5, i.e., the range where the concave portions 3a are formed in the loading path 3 (in the case where the concave and convex engagement region is exceeded, the sliding member 2 is not moved), a tap machining work for the end portion of the sliding member for preventing the rolling member retainer from being pulled apart, which is needed in the structure for retaining the rolling member by the conventional rolling member retainer may be dispensed with. Also in this respect, the machining work is extremely easy and the cost may be saved.

Incidentally, in the embodiment, the convex portions 5*a* are provided on the rolling member 5, the concave portions 3*a* are provided in the loading path 3 and these components are in concave and convex engagement with each other. However, as a matter of course, it is possible to adopt a reverse arrangement by providing the concave portions to the rolling member 5 and providing the convex portions to the loading path 3.

With such a structure of the embodiment, the rolling member retainer 6 is subjected to the load from the loading path 3 in accordance with the rolling movement of the rolling member 4, and the movement along the loading path 3 is suitably limited by the rolling member 5 that is in concave and convex engagement with the loading path 3 without fail whereby the problem such as the micro slip phenomenon in accordance with the displacement of the rolling member retainer 6 may be prevented.

In addition, since the rolling member 5 has substantially the same size as that of the other rolling members 4 retained in the rolling member retainer 6, the effective stroke length is not shortened. Also, since the rolling member 5 is rolled and moved while receiving the load from the loading path 3, not only may the rolling member retainer 6 be guided and moved along the loading path 3 under the positive concave and convex engagement condition but also this system may be realized by a simple structure.

Also, since the first loading portion forming member 7 and the second loading portion forming member 8 for forming the loading path 3, the rolling member 5 and the convex portions 5*a* are made of metal, it is possible to perform the machine work with high precision and the system is superior in rigidity. The concave and convex relationship between this rolling member 5 and the loading path 3 is kept in a very good condition. The rolling member retainer 6 may be guided and moved without fail. It is possible to prolong the service lift.

Also, since the rolling member 5 is constructed not to be coupled with the rolling member retainer 6 but to be retained at the rolling member retainer 6 in the same manner as the other rolling members 4, the structure is extremely simple, it is unnecessary to mount the rolling member retainer through the shaft as in the conventional case, and correspondingly, the number of steps for work and the number of the parts may be reduced so that the breakdown hardly would occur and the manufacture is simplified.

According to the embodiments described herein, it is possible to provide a sliding apparatus in which the micro slip phenomenon may be positively suppressed, and this may be realized with a simple structure which is less expensive and superior in practical use and in productivity.

What is claimed is:

1. A sliding apparatus comprising:
    a sliding member slidable relative to a shaft;
    a loading path provided between the shaft and the sliding member;
    a plurality of rolling members arranged in the loading path, said rolling members being adapted to roll and move along the loading path, wherein:
        at least one rolling member out of said plurality of rolling members arranged in the loading path comprises at least one convex rolling member portion;
        the loading path comprises at least one concave loading path portion engaged with the at least one convex rolling member portion;
        said at least one rolling member is arranged in the loading path in concave and convex engagement with the loading path; and
        the loading path comprises a rolling retainer for retaining the plurality of rolling members.

2. The sliding apparatus according to claim 1, wherein said at least one rolling member is adapted to retain the concave and convex engagement and roll and move along the loading path.

3. The sliding apparatus according to claim 2, wherein:
    said at least one rolling member comprises a plurality of convex rolling member portions provided at a predetermined interval on a circumferential surface of said at least one rolling member; and
    said loading path comprises a plurality of concave loading path portions provided at the same interval as that of the plurality of convex rolling member portions.

4. The sliding apparatus according to claim 3, wherein said at least one rolling member consists of a central rolling member out of said plurality of rolling members and said plurality of concave loading path portions are provided in a range where said central rolling member of moves.

5. The sliding apparatus according to claim 1, wherein:
    said at least one rolling member comprises a plurality of convex rolling member portions provided at a predetermined interval on a circumferential surface of said at least one rolling member; and
    said loading path comprises a plurality of concave loading path portions provided at the same interval as that of the plurality of convex rolling member portions.

6. The sliding apparatus according to claim 5, wherein said at least one rolling member consists of a central rolling member out of said plurality of rolling members and said plurality of concave loading path portions are provided in a range where said central rolling member of moves.

7. The sliding apparatus according to claim 1, wherein the loading path is composed of a first loading groove provided in the shaft and a second loading groove provided in the sliding member.

8. The sliding apparatus according to claim 7, wherein said first loading groove is formed in a first loading portion forming member provided in the shaft and said second loading groove is formed in a second loading portion forming member provided in the sliding member.

9. The sliding apparatus according to claim 7, wherein the at least one rolling member, the at least one convex rolling member portion, the first loading portion forming member and the second loading portion forming member are made of metal.

10. The sliding apparatus according to claim 1, wherein a first loading groove is formed in a first loading portion forming member provided in the shaft and a second loading groove is formed in a second loading portion forming member provided in the sliding member.

11. The sliding apparatus according to claim 10, wherein the at least one rolling member, the at least one convex rolling member portion, the first loading portion forming member and the second loading portion forming member are made of metal.

12. The sliding apparatus according to claim 1, wherein the at least one rolling member is formed integrally with said at least one convex rolling member portion.

13. The sliding apparatus according to claim 12, wherein a first loading groove is formed in a first loading portion forming member provided in the shaft and a second loading groove is formed in a second loading portion forming member provided in the sliding member.

14. The sliding apparatus according to claim 12, wherein the at least one rolling member, the at least one convex rolling member portion, a first loading portion forming member and a second loading portion forming member are made of metal.

15. The sliding apparatus according to claim 12, wherein the loading path is composed of a first loading groove provided in the shaft and a second loading groove provided in the sliding member.

16. The sliding apparatus according to claim 15, wherein said first loading groove is formed in a first loading portion forming member provided in the shaft and said second loading groove is formed in a second loading portion forming member provided in the sliding member.

17. The sliding apparatus according to claim 15, wherein the at least one rolling member, the at least one convex rolling member portion, the first loading portion forming member and the second loading portion forming member are made of metal.

18. The sliding apparatus according to claim 12, wherein:
cylindrical members are adopted as the plurality of rolling members;
the cylindrical members are arranged in a direction different from that of an adjacent cylindrical member; and
the at least one convex rolling member portion is provided on a drum portion of the cylindrical members.

19. The sliding apparatus according to claim 18, wherein a first loading groove is formed in a first loading portion forming member provided in the shaft and a second loading groove is formed in a second loading portion forming member provided in the sliding member.

20. The sliding apparatus according to claim 18, wherein the at least one rolling member, the at least one convex rolling member portion, the first loading portion forming member and the second loading portion forming member are made of metal.

21. The sliding apparatus according to claim 18, wherein the loading path is composed of a first loading groove provided in the shaft and a second loading groove provided in the sliding member.

22. The sliding apparatus according to claim 21, wherein said first loading groove is formed in a first loading portion forming member provided in the shaft and said second loading groove is formed in a second loading portion forming member provided in the sliding member.

23. The sliding apparatus according to claim 21, wherein the at least one rolling member, the at least one convex rolling member portion, the first loading portion forming member and the second loading portion forming member are made of metal.

24. The sliding apparatus according to claim 1, wherein:
cylindrical members are adopted as the plurality of rolling members;
the cylindrical members are arranged in a direction different from that of an adjacent cylindrical member; and
the at least one convex rolling member portion is provided on a drum portion of the cylindrical members.

25. The sliding apparatus according to claim 24, wherein a first loading groove is formed in a first loading portion forming member provided in the shaft and a second loading groove is formed in a second loading portion forming member provided in the sliding member.

26. The sliding apparatus according to claim 24, wherein the at least one rolling member, the at least one convex rolling member portion, the first loading portion forming member and the second loading portion forming member are made of metal.

27. The sliding apparatus according to claim 24, wherein the loading path is composed of a first loading groove provided in the shaft and a second loading groove provided in the sliding member.

28. The sliding apparatus according to claim 27, wherein said first loading groove is formed in a first loading portion forming member provided in the shaft and said second loading groove is formed in a second loading portion forming member provided in the sliding member.

29. The sliding apparatus according to claim 27, wherein the at least one rolling member, the at least one convex rolling member portion, the first loading portion forming member and the second loading portion forming member are made of metal.

* * * * *

UNITED STATES PATENT AND TRADEMARK OFFICE
CERTIFICATE OF CORRECTION

| | |
|---|---|
| PATENT NO. | : 7,210,849 B2 |
| APPLICATION NO. | : 10/840606 |
| DATED | : May 1, 2007 |
| INVENTOR(S) | : Mitsuru Yamazaki et al. |

It is certified that error appears in the above-identified patent and that said Letters Patent is hereby corrected as shown below:

\*\* Title Page item 75 [[Matsuru]] Yamazaki, should be Mitsuru Yamazaki. \*\*

Signed and Sealed this

Eighteenth Day of December, 2007

JON W. DUDAS
*Director of the United States Patent and Trademark Office*